(12) United States Patent
Gao et al.

(10) Patent No.: US 10,111,149 B2
(45) Date of Patent: Oct. 23, 2018

(54) METHOD AND BASE STATION FOR PROCESSING SELECTED IP TRAFFIC OFFLOAD CONNECTION

(71) Applicant: ZTE CORPORATION, Shenzhen, Guangdong Province (CN)

(72) Inventors: Yin Gao, Shenzhen (CN); Shuang Liang, Shenzhen (CN); Feng He, Shenzhen (CN)

(73) Assignee: ZTE CORPORATION (CN)

( * ) Notice: Subject to any disclaimer, the term of this patent is extended or adjusted under 35 U.S.C. 154(b) by 175 days.

(21) Appl. No.: 15/037,721

(22) PCT Filed: May 15, 2014

(86) PCT No.: PCT/CN2014/077542
§ 371 (c)(1),
(2) Date: May 19, 2016

(87) PCT Pub. No.: WO2015/085709
PCT Pub. Date: Jun. 18, 2015

(65) Prior Publication Data
US 2016/0302126 A1    Oct. 13, 2016

(30) Foreign Application Priority Data
Dec. 12, 2013  (CN) .......................... 2013 1 0680720

(51) Int. Cl.
*H04W 4/00*        (2018.01)
*H04W 36/22*       (2009.01)
(Continued)

(52) U.S. Cl.
CPC ........... *H04W 36/22* (2013.01); *H04W 36/08* (2013.01); *H04W 76/30* (2018.02)

(58) Field of Classification Search
CPC .............................. H04W 36/22; H04W 36/08
(Continued)

(56) References Cited

U.S. PATENT DOCUMENTS

2012/0314688 A1    12/2012  Taleb et al.
2013/0003697 A1     1/2013  Adjakple et al.
2016/0227439 A1*    8/2016  Wang .................. H04W 76/022

FOREIGN PATENT DOCUMENTS

CN         102158915 A      8/2011
CN         102215537 A     10/2011
(Continued)

OTHER PUBLICATIONS

Nsn et al., Handover procedure in case of bearer only served by SeNB (Form Applicant's IDS filed on Sep. 19, 2017).*
(Continued)

*Primary Examiner* — Mang Yeung
(74) *Attorney, Agent, or Firm* — Plumsea Law Group, LLC (57) ABSTRACT

A method and a base station for processing an SIPTO (Selected IP Traffic Offload) connection, the method includes: when a terminal is handed over from a source SeNB (Secondary eNB) to a destination SeNB, receiving, by an MeNB (Master eNB), an interface message from the destination SeNB (11), herein the source SeNB supports a collocated L-GW (Local Gateway); and when a handover success acknowledgement message sent by the destination SeNB is received, triggering, by the MeNB, the source SeNB to notify the L-GW to release an SIPTO@LN (Selected IP Traffic Offload at Local Network) connection (12). Through the embodiments of the present document, the release of the SIPTO@LN connection in a collocated L-GW scenario under a small base station environment can be effectively implemented.

12 Claims, 5 Drawing Sheets

(51) Int. Cl.
*H04W 36/08* (2009.01)
*H04W 76/30* (2018.01)

(58) Field of Classification Search
USPC .......................................................... 370/331
See application file for complete search history.

(56) References Cited

FOREIGN PATENT DOCUMENTS

| CN | 102763456 A | 10/2012 |
|---|---|---|
| CN | 102843727 A | 12/2012 |
| WO | 2015085709 A1 | 6/2015 |

OTHER PUBLICATIONS

Japanese Office Action dated Aug. 1, 2017 for Japanese patent application No. 2016-536633.
European Search Report dated Jun. 22, 2017 for European Patent Application No. 14869988.7.
Samsung "Leftover issues: Handling upon receiving UE Context Release/modification", 3rd Generation Partnership Project (3GPP), Mobile Competence Centre; France; vol. RAN WG3. No. San Francisco. U.S; 20131111 - 20131115, Nov. 12, 2013.
Nsn et al: "Handover procedure in case of bearer only served by SeNB (1A)", 3rd Generation Partnership Project (3GPP); Mobile Competence Centre; France; vol. RAN WG3. No. San Francisco, USA; 28131111 - 28131115, Nov. 13, 2013.
CATT: "Overall Signaling flow over S1/Xn for 1A", 3rd Generation Partnership Project (3GPP). Mobile Competence Centre, France; vol. RAN WG3. No. San Francisco, CA, USA; 20131111 - 20131115, Nov. 12, 2013.
Samsung: "LIPA/SIPTO support in the small cell", 3rd Generation Partnership Project (3GPP). Mobile Competence Centre; France; vol. RAN WG3; No. Barcelona, Spain; 20138819 - 20130823, Aug. 10, 2013.
ZTE: "Discussion on RAN3 impact for SIPTO@LN", 3rd Generation Partnership Project (3GPP). Mobile Competence Centre; France; vol. RAN WG3. No. Fukuoka, Japan; 20130520 - 20130524, May 10, 2013.
ZTE: "Signaling Flows of Solution 1A", 3rd Generation Partnership Project (3GPP). Mobile Competence Centre; France; vol. RAN WG3. No. San Francisco, CA, USA; Nov. 11-15, 2013.
International Search Report dated Sep. 11, 2014 in PCT Patent Application No. PCT/CN20141077542.
Written Opinion dated Sep. 11, 2014 in PCT Patent Application No. PCT/CN2014/077542.

\* cited by examiner

METHOD AND BASE STATION FOR PROCESSING SELECTED IP TRAFFIC OFFLOAD CONNECTION

CROSS-REFERENCE TO RELATED APPLICATION(S)

This application is the U.S. National Phase application of PCT application number PCT/CN2014/077542 having a PCT filing date of May 15, 2014, which claims priority of Chinese patent application 201310680720.2 filed on Dec. 12, 2013, the disclosures of which are hereby incorporated by reference.

TECHNICAL FIELD

The present document relates to the field of communication, in particular to a method and base station for processing a selected IP traffic offload connection under a small base station environment.

BACKGROUND OF RELATED ART

Figure 1:
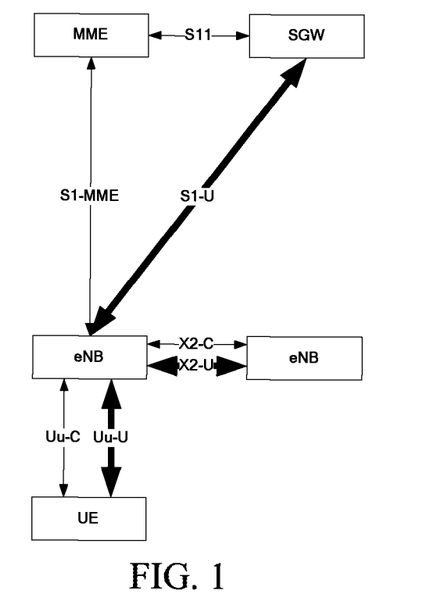
FIG. 1 is a schematic diagram of an overall architecture of LTE in the related art.

FIG. 1 is a schematic diagram of an overall architecture of an LTE (Long Term Evolution) system in the related art. As shown in FIG. 1, a LTE architecture comprises an MME (Mobility Management Entity), an SGW (Serving Gateway), a User Equipment or Terminal (called as UE for short) and base stations (eNodeB, called as eNB for short), herein interfaces between the UE and the eNB are Uu interfaces, an interface between the eNB and the MME is an S1-MME (S1 for the control plane) interface, an interface between the eNB and the SGW is an S1-U interface, and interfaces between the eNBs are X2-U (X2-User plane) and X2-C (X2-Control plane) interfaces. In LTE, a protocol stack of the S1-MME interface is divided into the following protocol layers from bottom to top: L1 protocol, L2 protocol, IP (Internet Protocol), SCTP (Stream Control Transmission Protocol), and S1-AP (S1-Application Protocol). In LTE, a protocol stack of the S1-U interface is divided into the following protocol layers from bottom to top: L1 protocol, L2 protocol, UDP/IP (User Data Protocol/Internet Protocol), and GTP-U (GPRS Tunneling Protocol-User plane).

Figure 2:
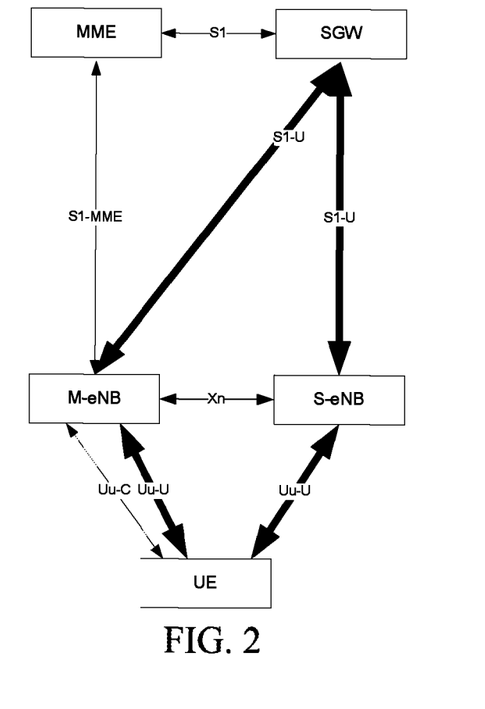
FIG. 2 is a schematic diagram of a dual-connection user plane 1A architecture in a small base station scenario in the related art.

At present, due to the lack of frequency spectrum resources and the sharp increase of high-traffic services of mobile users, in order to increase user throughput and improve mobility performance, the demand of performing hotspot coverage by adopting high-frequency points such as 3.5 GHz is increasingly obvious, and adopting low-power nodes becomes a new application scenario. However, since signal attenuation of high-frequency points is comparatively serious, the coverage range of new cells is comparatively small and the new cells and the existing cells are not at the same site, hence, if users move between these new cells or between the new cells and the existing cells, frequent handover processes inevitably will be caused, consequently user information will be frequently transmitted between the base stations, a very great signaling shock will be caused to a core network and the introduction of numerous small cellular base stations on a wireless side will be restrained. FIG. 2 is a schematic diagram of an overall architecture of a small cellular base station system. As shown in FIG. 2, the architecture comprises an MME, an SGW, UE(s) and base stations (eNobeB, called as eNB for short), herein interfaces between the UE and the eNB are Uu interfaces, an interface between the MeNB and the MME is an S1-MME (S1 for the control plane) interface, an interface between the M-eNB or SeNB and the SGW is an S1-U interface, and an interface between the eNBs is Xn interface. User data can be issued from the core network to users through the M-eNB, and can also be issued from the core network to the users through the S-eNB. After the users access to the M-eNB, a dual-connection can be implemented by adding, modifying and deleting the S-eNB.

Figure 3:
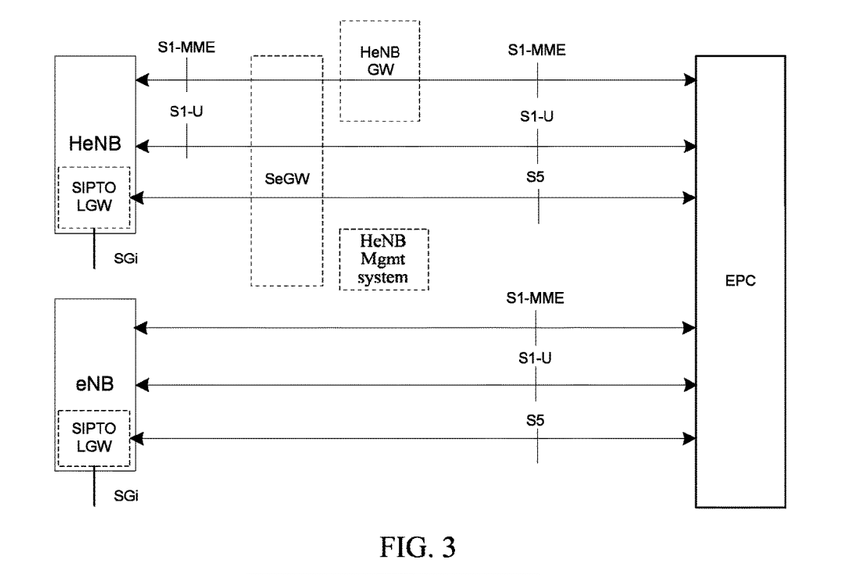
FIG. 3 is a schematic diagram of an architecture supporting SIPTO@LN and collocated L-GW in the related art.

Simultaneously, with wide demands by users for local services and Internet services, for the UEs and the core network, a permanent online function is supported, i.e., after a data connection is established, the UE can transmit data to external data networks at any time, the external data networks can also transmit data to the UE. The external data networks involved in this document refer to IP networks which do not belong to a PLMN (Public Land Mobile Network) but are connected with the PLMN, and for example, can be home internal networks or Internet. This function is called as an LIPA@LN (Local IP Access at Local Network) or SIPTO@LN (Selected IP Traffic Offload at Local Network) function. If an L-GW (Local Gateway) which supports LIPA or SIPTO services is arranged on a base station (which can be a macro eNB and can also be a home eNB), this base station is called as a collocated L-GW. For a system architecture supporting SIPTO@LN and col-located L-GW, see FIG. 3.

Under the current LTE system, in order to realize an SIPTO@LN function, in a scenario of a collocated L-GW, a base station (which can be a macro base station and can also be a home base station) on which the collocated L-GW is located does not support mobility of an SIPTO@LN service, i.e., when the UE moves to another base station, an SIPTO@LN PDN (Public Data Network) connection needs to be released. A related release manner is that, after UE handover is successfully completed, the release is triggered through a UE text release message of an S1 or X2 interface. If what is performed by the UE is an S1 handover process, the base station receives the UE text release message on the S1 interface and a cause value indicates handover success, the base station notifies the L-GW through an internal channel to perform SIPTO@LN connection release. If what is performed by the UE is an X2 handover process, after the source base station receives the UE text release message on the X2 interface, the source base station notifies the L-GW through an internal channel to perform SIPTO@LN connection release. Under the above-mentioned small base station system, since concepts of MeNB (Master eNB) and SeNB (Secondary eNB) are introduced, a specific position of the collocated L-GW and how to implement SIPTO@LN connection release when the MeNB or SeNB changes are not considered in the related art.

SUMMARY

The technical problem to be solved by the present document is to provide a method and a base station for processing an SIPTO (Selected IP Traffic Offload) connection, so as to implement SIPTO connection release.

In order to solve the technical problem, the present document provides a method for processing a selected IP traffic offload connection, comprising:

when a terminal is handed over from a source secondary base station to a destination secondary base station, receiving, by a master base station, an interface message from the destination secondary base station, herein the source secondary base station supports a collocated local gateway; and when a handover success acknowledgement message sent by the destination secondary base station is received, triggering, by the master base station, the source secondary base station to notify a local gateway to release a selected IP traffic offload connection.

Preferably, the method further has the following feature: triggering, by the master base station, the source secondary base station to notify a local gateway to release a selected IP traffic offload connection is implemented by the following manner:

sending, by the master base station, a designated interface message or an interface message comprising a designated information element or a newly-added information element to the source secondary base station.

In order to solve the problem, the present document further provides a base station, used as a master base station under a small base station system, herein this master base station comprises:

a receiving module, configured to: when a terminal is handed over from a source secondary base station to a destination secondary base station, receive an interface message from the destination secondary base station, herein the source secondary base station supports a collocated local gateway; and a triggering module, configured to: when a handover success acknowledgement message sent by the destination secondary base station is received, trigger the source secondary base station to notify a local gateway to release a selected IP traffic offload connection.

Preferably, the base station further has the following feature:

the triggering module is configured to send a designated interface message or an interface message comprising a designated information element or a newly-added information element to the source secondary base station.

In order to solve the problem, the present document further provides a method for processing a selected IP traffic offload connection, comprising:

receiving, by a secondary base station supporting a collocated local gateway, a triggering message from a master base station; and if the secondary base station detects that a selected IP traffic offload connection at a local network exists at present, notifying, by the secondary base station, a local gateway to release the selected IP traffic offload connection at the local network.

Preferably, the method further has the following feature: the triggering message comprises:

a designated interface message, or an interface message comprising a designated information element or a newly-added information element.

Preferably, the method further has the following feature: after the secondary base station receives the triggering message from the master base station, the method further comprises:

releasing, by the secondary base station, a corresponding terminal related service bearer.

In order to solve the problem, the present document further provides a base station, used as a secondary base station supporting a collocated local gateway under a small base station system, herein the secondary base station comprises:

a receiving module, configured to: receive a triggering message from a master base station; and a notification module, configured to: if that a selected IP traffic offload connection at a local network exists at present is detected, notify a local gateway to release the selected IP traffic offload connection at the local network.

Preferably, the above-mentioned base station further has the following feature:

the receiving module is configured to receive the triggering message comprising a designated interface message or an interface message comprising a designated information element or a newly-added information element.

Preferably, the above-mentioned base station further has the following feature: the above-mentioned base station further comprises:

a release module, configured to release a corresponding terminal related service bearer after the receiving module receives the triggering message from the master base station.

To sum up, the embodiments of the present document provide a method and a base station for processing an SIPTO connection, which can effectively implement the release of the SIPTO@LN connection in a collocated L-GW scenario under a small base station environment.

PREFERRED EMBODIMENTS

The embodiments of the present document will be described below in detail in combination with the drawings. It needs to be stated that the embodiments and the features of the embodiments in the present application can be arbitrarily combined with one another under the situation of no conflict.

Figure 4:
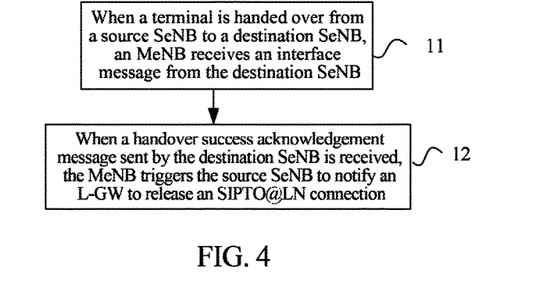
FIG. 4 is a flowchart of a method for processing an SIPTO@LN connection by an MeNB according to the embodiment of the present document.

FIG. 4 is a flowchart of a method for processing an SIPTO@LN connection by an MeNB according to the embodiment of the present document. As shown in FIG. 4, the method provided by the embodiment comprises the following steps:

In Step 11, when a terminal is handed over from a source SeNB to a destination SeNB, an MeNB receives an interface message of the destination SeNB, herein the source SeNB supports a collocated local gateway; and In S12, when a handover success acknowledgement message sent by the destination SeNB is received, the MeNB triggers the source SeNB to notify an L-GW to release an SIPTO@LN connection.

Figure 5:
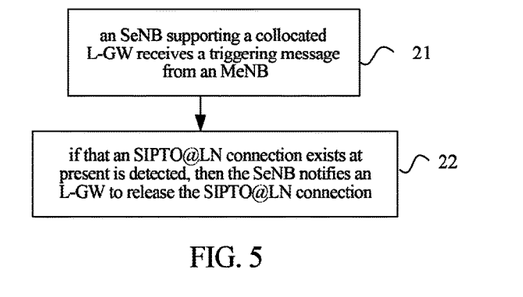
FIG. 5 is a flowchart of a method for processing an SIPTO@LN connection by an SeNB according to the embodiment of the present document.

FIG. 5 is a flowchart of a method for processing an SIPTO@LN connection by an SeNB according to the embodiment of the present document. As shown in FIG. 5, the method provided by the embodiment comprises the following steps:

In Step 21, an SeNB supporting a collocated L-GW receives a triggering message from an MeNB; and In Step 22, if the SeNB detects that an SIPTO@LN connection exists at present, then the SeNB notifies an L-GW to release the SIPTO@LN connection.

The triggering message in step 21 can comprise:

a designated interface message (such as a release request message in embodiment 1, a change completion message in embodiment 2 and embodiment 3 below, etc), or an interface message comprising a designated information element or a newly-added information element.

In this embodiment, when the collocated L-GW is located on the SeNB and the SeNB changes, the MeNB can trigger the source SeNB through an Xn interface message to notify the L-GW through an internal channel to release the XIPTO@LN connection.

The above-mentioned Xn interface is an interface between the MeNB/SeNB and the SeNB. The interface between MeNB/SeNB and the SeNB can also be an X2 interface.

The embodiments of the present document are not limited to the LTE system, and are also applicable to a 3G system.

The method for processing the SIPTO@LN connection provided by the embodiments of the present document can implement the SIPTO@LN connection release through information exchange between base stations on a network side aiming at a dual-connection service feature under a complex small base station environment, provide a guarantee for the implementation of a SIPTO@LN function, and enable the network side to implement SIPTO@LN connection management aiming at a dual-connection scenario, and facilitate the improvement of network performance.

The method for processing the SIPTO@LN connection provided by the present document will be described below in detail in combination with specific embodiments.

Embodiment 1

Figure 6:
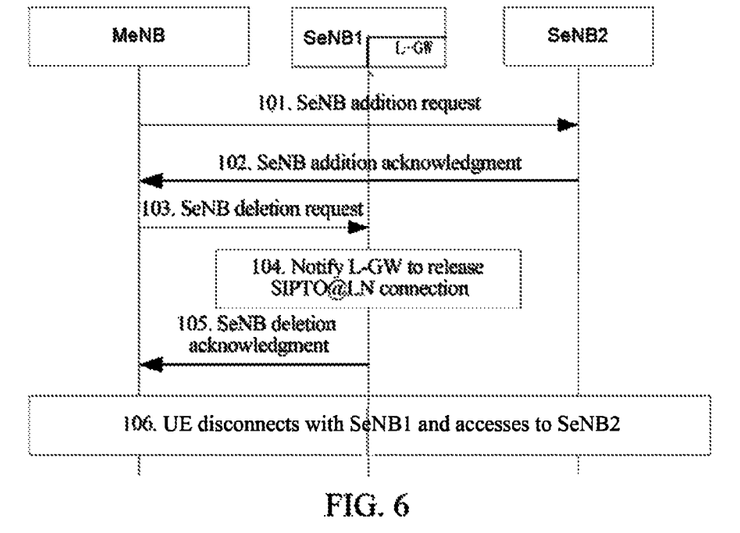
FIG. 6 is a flowchart of a method for processing an SIPTO@LN connection according to embodiment 1 of the present document.

Scenario 1: an MeNB triggers an SeNB change, the MeNB does not support a collocated L-GW, the SeNB1 supports the collocated L-GW, the SeNB2 supports or does not support the L-GW, and interfaces between base stations are Xn interfaces. As shown in FIG. 6, the method comprises the following steps:

In Step 101, UE is in a dual-connection state at present, user data are provided for service by an MeNB and an SeNB1, SIPTO@LN service data are provided for service by the SeNB1 because SeNB1 supports the L-GW, according to a measurement report reported by the UE, the MeNB determines to change the SeNB for the UE, delete the SeNB1 and add an SeNB2, and the MeNB sends an addition request to the SeNB2;

In Step 102, after successfully performing local processing, the SeNB2 sends an addition acknowledgment message to the MeNB;

In Step 103, after successfully adding the SeNB2, the MeNB triggers the deletion work of the SeNB1 through an Xn interface message, and the MeNB sends a deletion request to the SeNB1 through an Xn interface;

In Step 104, the SeNB1 performs local processing after a release request message from the MeNB is received, releases related service bearer for the UE, and if an SIPTO@LN connection exists at present, then the SeNB1 notifies the L-GW through an internal channel to release the SIPTO@LN connection;

In Step 105, the SeNB1 sends a deletion acknowledgment message to the MeNB;

In Step 106, UE disconnects from the SeNB1 and assesses to the new SeNB2.

Embodiment 2

Figure 7:
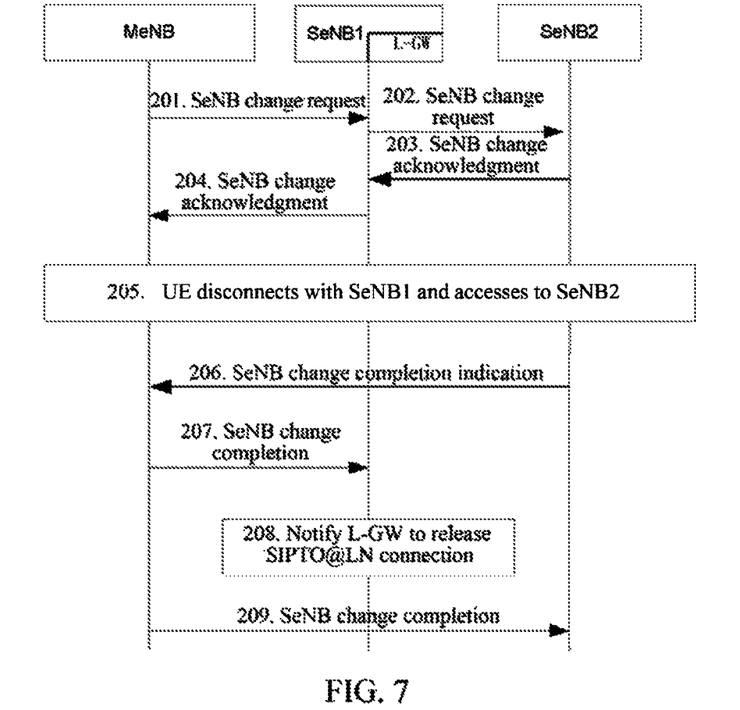
FIG. 7 is a flowchart of a method for processing an SIPTO@LN connection according to embodiment 2 of the present document.

Scenario 2: an MeNB triggers an SeNB change, the MeNB does not support a collocated L-GW, the SeNB1 supports the collocated L-GW, the SeNB2 supports or does not support the L-GW, and interfaces between base stations are Xn interfaces. As shown in FIG. 7, the method comprises the following steps:

In Step 201, UE is in a dual-connection state at present, user data are provided for service by an MeNB and an SeNB1, SIPTO@LN service data are provided for service by the SeNB1 because SeNB1 supports the L-GW, according to a measurement report reported by the UE, the MeNB determines to change the SeNB for the UE, delete the SeNB1 and add an SeNB2, and the MeNB sends an SeNB change request to the SeNB1;

In S202, the SeNB1 sends a change request message to the SeNB2 through an Xn interface;

In Step 203, after the SeNB2 performs local processing for agreement to be added successfully, the SeNB2 sends a change acknowledgment message to the SeNB1 through an Xn interface message;

In Step 204, the SeNB1 sends the acknowledgment message to the MeNB;

In Step 205, the UE disconnects from the SeNB1 and accesses to the new SeNB2;

In Step 206, after the UE is successfully accessed to the SeNB2, the SeNB2 sends a change completion indication to the MeNB;

In Step 207, the MeNB sends a change completion message to the SeNB1;

In Step 208, the SeNB1 performs local processing after the change completion message is received, releases related service bearer for the UE, and if an SIPTO@LN connection exists at present, then the SeNB1 notifies the L-GW through an internal channel to release the SIPTO@LN connection;

In Step 209, the MeNB sends a change completion message to the SeNB2.

Embodiment 3

Figure 8:
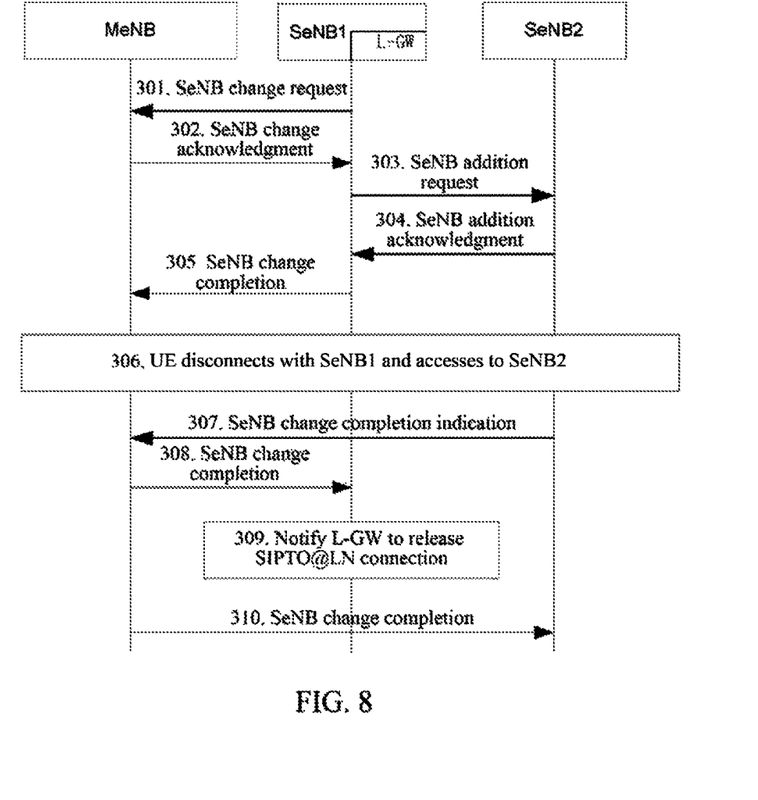
FIG. 8 is a flowchart of a method for processing an SIPTO@LN connection according to embodiment 3 of the present document.

Scenario 3: an SeNB triggers an SeNB change, an MeNB does not support a collocated L-GW, an SeNB1 supports the collocated L-GW, an SeNB2 supports or does not support the L-GW, and interfaces between base stations are Xn interfaces. As shown in FIG. 8, the method comprises the following steps:

In Step 301, UE is in a dual-connection state at present, user data are provided for service by an MeNB and an SeNB1, SIPTO@LN service data are provided for service by the SeNB1 because SeNB1 supports the L-GW, according to local loads and other local policies, the SeNB1 determines to not provide service for the UE any longer, and the SeNB1 sends an SeNB change request to the MeNB;

In Step 302, after the MeNB receives the change request, the MeNB judges whether to accept the SeNB change request and select a proper SeNB2 for the UE according to the obtained relevant information such as a measurement report from the UE, and if accepting, the MeNB sends an SeNB change acknowledgment message to the SeNB1;

In Step 303, after SeNB1 receives the SeNB change acknowledgment message, the SeNB1 sends an addition request to notify the SeNB2 to complete an addition preparation;

In Step 304, the SeNB2 feeds an addition acknowledgment message back to the SeNB1;

In Step 305, the SeNB1 sends a change completion message to the MeNB;

In Step 306, UE disconnects from the SeNB1 and accesses to the new SeNB2;

In Step 307, after the UE successfully accesses to the SeNB2, the SeNB2 sends a change completion indication to the MeNB;

In Step 308, the MeNB sends a change completion message to the SeNB1;

In Step 309, the SeNB1 performs local processing after the change completion message is received, releases related service bearer for the UE, and if an SIPTO@LN connection exists at present, then the SeNB1 notifies the L-GW through an internal channel to release the SIPTO@LN connection;

In Step 310, the MeNB sends a change completion message to the SeNB2.

In step 308 above, the MeNB can also send an Xn interface message comprising a designated information element or a newly-added information element to the SeNB1 to trigger the SeNB1 to notify the L-GW through the internal channel to release the SIPTO@LN connection.

Figure 9:
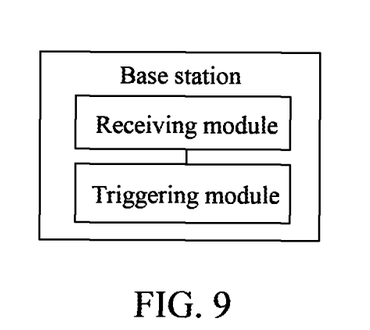
FIG. 9 is a schematic diagram of a base station according to one embodiment of the present document.

FIG. 9 is a schematic diagram of a base station according to one embodiment of the present document. The base station provided by the embodiment is used as an MeNB under a small base station system. As shown in FIG. 9, the base station provided by the embodiment comprises the following modules:

a receiving module, used to, when a terminal is handed over from a secondary base station which supports a collocated local gateway to a destination secondary base station, receive an Xn interface message of the destination secondary base station; and a triggering module, used to, when a handover success acknowledgement message sent by the destination secondary base station is received, trigger the secondary base station which supports the collocated local gateway to notify a local gateway to release a selected IP traffic offload connection.

Herein, the triggering module specifically can be used to send a designated Xn interface message or an Xn interface message comprising a designated information element or a newly-added information element to the secondary base station which supports the collocated local gateway.

Figure 10:
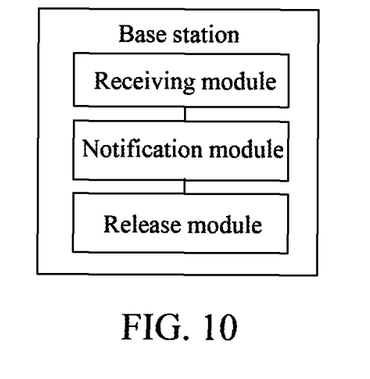
FIG. 10 is a schematic diagram of a base station according to another embodiment of the present document.

FIG. 10 is a schematic diagram of a base station according to another embodiment of the present document. The base station provided by the embodiment is used as an SeNB which supports a collocated local gateway under a small base station system. As shown in FIG. 10, the base station provided by the embodiment comprises the following modules:

a receiving module, used to receive a triggering message from a master base station; and a notification module, used to, if that a selected IP traffic offload connection at a local network exists at present is detected, notify a local gateway to release the selected IP traffic offload connection at the local network.

Herein, the triggering message received by the receiving module can comprise: a designated Xn interface message or an Xn interface message comprising a designated information element or a newly-added information element.

In one preferred embodiment, the base station further comprises:

a release module, used to release a corresponding terminal related service bearer after the receiving module receives the triggering message from the master base station.

One ordinary skilled in the art can understand that all or partial steps in the above-mentioned methods can be completed by relevant hardware instructed by a program, and the program can be stored in a computer readable storage medium such as a read only memory, a magnetic disk or a compact disk etc. Optionally, all or partial steps of the above-mentioned embodiments can also be implemented by using one or more integrated circuits. Correspondingly, each module/unit in the above-mentioned embodiments can be implemented by means of hardware, and can also be implemented by means of a software function module. The present document is not limited to combinations of hardware and software in any specific form.

The above-mentioned embodiments are just preferred embodiments of the present document. Of course, the present document may also have other embodiments. One skilled in the art can make various corresponding modifications and variations according to the present document without departing from the rule and essence of the present document. However, all these corresponding modifications and variations shall also belong to the protection range of claims annexed to the present document.

INDUSTRIAL APPLICABILITY

The embodiments of the present document provide a method and a base station for processing an SIPTO connection, which can effectively implement the release of the SIPTO@LN connection in a collocated L-GW scenario under a small base station environment.

What is claimed is:

1. A method for processing a selected IP traffic offload connection, comprising:

receiving, by a master base station, in response to determining that a terminal is handed over from a source secondary base station to a destination secondary base station, an interface message from the destination secondary base station, wherein the source secondary base station supports a collocated local gateway which is a local gateway collocated with the source secondary base station and supporting a Selected Internet Protocol (IP) Traffic Offload (SIPTO) or Local IP Access (LIPA) service; and triggering, by the master base station, in response to determining that the handover to the destination secondary base station was successful, the source secondary base station to notify the collocated gateway to release a Selected IP Traffic Offload at Local Network (SIPTO@LN) Public Data Network (PDN) connection.

2. The method according to claim 1, wherein triggering, by the master base station, the source secondary base station to notify the collocated gateway to release the SIPTO@LN PDN connection is implemented by the following manner:

sending, by the master base station, a designated interface message or an interface message comprising a designated information element or an added information element to the source secondary base station.

3. A master base station under a base station system, comprising:

a receiving module configured to: responsive to determining that a terminal is handed over from a source secondary base station to a destination secondary base station, receive an interface message which is sent to the master base station from the destination secondary base station, wherein the source secondary base station supports a collocated local gateway which is a local gateway collocated with the source secondary base station and supporting a Selected Internet Protocol (IP) Traffic Offload (SIPTO) or Local IP Access (LIPA) service; and a triggering module configured to: responsive to determining that a handover success acknowledgement message sent by the destination secondary base station is received by the master base station, trigger the source secondary base station to notify the collocated gateway to release a Selected IP Traffic Offload at Local Network (SIPTO@LN) Public Data Network (PDN) connection.

4. The master base station according to claim 3, wherein, the triggering module is configured to send a designated interface message or an interface message comprising a designated information element or an added information element to the source secondary base station.

5. A method for processing a selected IP traffic offload connection, comprising:

receiving, by a source secondary base station supporting a collocated local gateway which is a local gateway collocated with the source secondary base station and supporting a Selected Internet Protocol (IP) Traffic Offload (SIPTO) or Local IP Access (LIPA) service, a triggering message from a master base station, wherein the trigger message is generated by the master base station responsive to determining that a terminal is handed over from the source secondary base station to a destination secondary base station based on an interface message received by the master base station from the destination secondary base station; and requesting, by the source secondary base station, the collocated local gateway to release a Selected IP Traffic Offload at Local Network (SIPTO@LN) Public Data Network (PDN) connection in response to determining that the source secondary base station detects that the SIPTO@LN PDN connection exists at present, wherein the source secondary base station supports local gateway function for SIPTO@LN operation.

6. The method according to claim 5, wherein the triggering message comprises:

a designated interface message, or an interface message comprising a designated information element or an added information element.

7. The method according to claim 6, wherein, after the source secondary base station receives the triggering message from the master base station, the method further comprises:

releasing, by the source secondary base station, a corresponding terminal related service bearer.

8. The method according to claim 5, wherein, after the source secondary base station receives the triggering message from the master base station, the method further comprises:

releasing, by the source secondary base station, a corresponding terminal related service bearer.

9. A source secondary base station under a base station system, comprising:

a receiving module configured to: receive a triggering message which is sent to the source secondary base station from a master base station, wherein the trigger message is generated by the master base station responsive to determining that a terminal is handed over from the source secondary base station to a destination secondary base station based on an interface message received by the master base station from the destination secondary base station; and a notification module configured to: responsive to detection that a Selected IP Traffic Offload at Local Network (SIPTO@LN) Public Data Network (PDN) connection at a local network exists at present, send from the source secondary base station, a notification to a collocated gateway to release the SIPTO@LN PDN connection at the local network;

wherein the source secondary base station supports local gateway function for SIPTO@LN operation and the collocated local gateway, which is a local gateway collocated with the source secondary base station and supporting a Selected Internet Protocol (IP) Traffic Offload (SIPTO) or Local IP Access (LIPA) service.

10. The source secondary base station according to claim 9, wherein, the receiving module is configured to receive the triggering message comprising a designated interface message or an interface message comprising a designated information element or an added information element.

11. The source secondary base station according to claim 10, wherein the source secondary base station further comprises:

a release module, configured to release a corresponding terminal related service bearer after the receiving module receives the triggering message from the master base station.

12. The source secondary base station according to claim 9, wherein the source secondary base station further comprises:

a release module, configured to release a corresponding terminal related service bearer after the receiving module receives the triggering message from the master base station.

* * * * *